United States Patent
Veret

(10) Patent No.: US 9,129,131 B2
(45) Date of Patent: Sep. 8, 2015

(54) DISTRIBUTED DATABASE

(75) Inventor: Grégory Veret, Paris (FR)

(73) Assignee: XOOLOO, Paris (FR)

( * ) Notice: Subject to any disclaimer, the term of this patent is extended or adjusted under 35 U.S.C. 154(b) by 958 days.

(21) Appl. No.: 12/675,899

(22) PCT Filed: Aug. 28, 2008

(86) PCT No.: PCT/FR2008/051541
§ 371 (c)(1),
(2), (4) Date: Mar. 1, 2010

(87) PCT Pub. No.: WO2009/030864
PCT Pub. Date: Mar. 12, 2009

(65) Prior Publication Data
US 2011/0154053 A1  Jun. 23, 2011

(30) Foreign Application Priority Data
Aug. 30, 2007 (FR) .................................. 07 06090

(51) Int. Cl.
G06F 21/00 (2013.01)
G06F 21/62 (2013.01)
G06F 17/30 (2006.01)
H04L 29/06 (2006.01)

(52) U.S. Cl.
CPC ............ *G06F 21/6227* (2013.01); *G06F 17/30* (2013.01); *G06F 21/6218* (2013.01); *H04L 63/0428* (2013.01)

(58) Field of Classification Search
CPC .. H04L 63/0428; G06F 21/6218; G06F 17/30
USPC ............ 726/4, 21, 26, 29; 713/165, 167, 189, 713/193; 380/255
See application file for complete search history.

(56) References Cited

U.S. PATENT DOCUMENTS

| | | | |
|---|---|---|---|
| 5,418,852 A * | 5/1995 | Itami et al. | 705/57 |
| 6,041,324 A | 3/2000 | Earl et al. | |
| 6,785,810 B1 * | 8/2004 | Lirov et al. | 713/165 |
| 7,185,205 B2 * | 2/2007 | Launchbury et al. | 713/189 |
| 2002/0029348 A1 * | 3/2002 | Du et al. | 713/193 |
| 2004/0078586 A1 * | 4/2004 | Sato et al. | 713/193 |
| 2004/0187014 A1 | 9/2004 | Molaro | |
| 2005/0044059 A1 | 2/2005 | Samar | |
| 2005/0055437 A1 | 3/2005 | Burckart et al. | |
| 2005/0139657 A1 * | 6/2005 | Hopkins | 235/382.5 |
| 2005/0149520 A1 | 7/2005 | DeVries | |
| 2006/0253578 A1 | 11/2006 | Dixon et al. | |
| 2008/0028444 A1 * | 1/2008 | Loesch et al. | 726/4 |

FOREIGN PATENT DOCUMENTS

EP   6041324   3/2000

OTHER PUBLICATIONS

International Search Report for related international application No. PCT/FR2008/051541, report dated Feb. 26, 2009.

* cited by examiner

*Primary Examiner* — Carl Colin
*Assistant Examiner* — Gary Lavelle
(74) *Attorney, Agent, or Firm* — Miller, Matthias & Hull LLP

(57) ABSTRACT

The invention relates to a module to be included onboard the equipment of a telecommunication network and comprising: a database storing at least search field values including URL addresses, at least some of said URL addresses being stored in an encrypted form, encryption means capable of encrypting a piece of information received by the module in order to allow an information search in the database by comparison with the encrypted search field values.

10 Claims, 6 Drawing Sheets

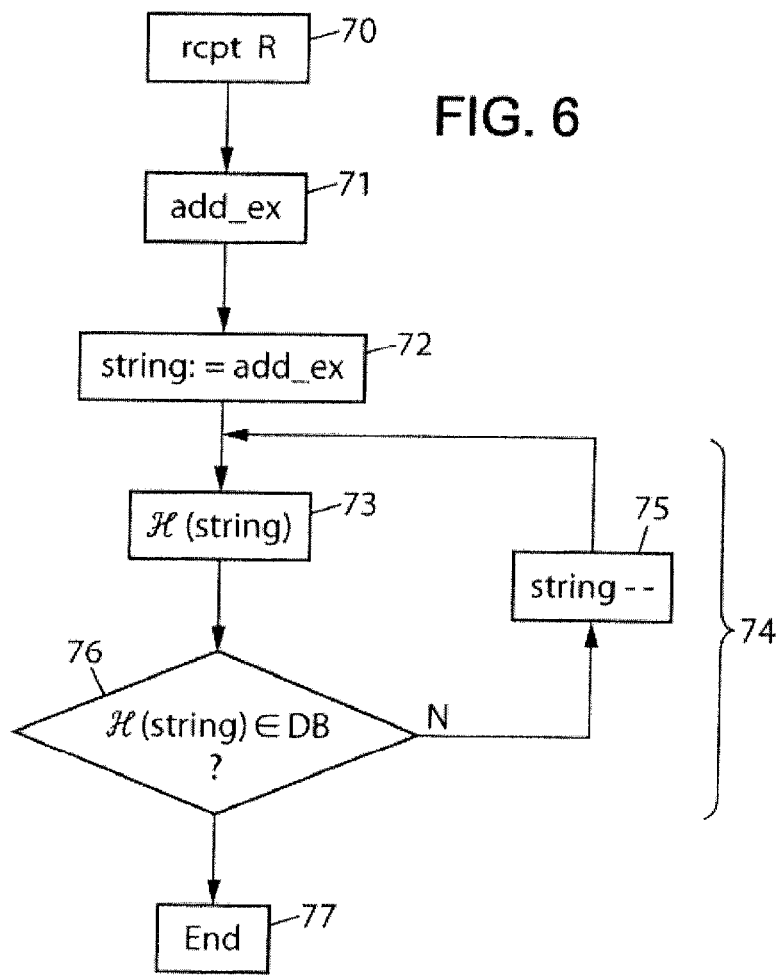

DISTRIBUTED DATABASE

CROSS-REFERENCE TO RELATED APPLICATIONS

This application is a §371 National Phase Filing of International Patent Application No. PCT/FR2008/051541 claiming priority under the Paris Convention to French Application No. 07 06090, filed on Aug. 30, 2007.

FIELD OF THE DISCLOSURE

The invention relates to the field of distributed URL address databases. As shown in FIG. 1, it is known to transmit from a central equipment 1 to a distributed equipment 2 a copy of at least a portion of a mother database 3 stored in the central equipment 1. This database 4, received by and stored in the distributed equipment 2, is called a distributed database, an onboard database or a daughter database.

BACKGROUND OF THE DISCLOSURE

The distributed equipment 2 is capable of being interrogated regarding the content of the daughter database 4, for example by client items of equipment 5, 6, 7, which can comprise user terminals. According to another example, the distributed equipment comprises a user interface allowing to interrogate it directly.

The mother 3 and daughter 4 databases are structured with entries, each entry comprising at least one search field value and optionally one or more attributes.

During an interrogation step, the distributed equipment 2 receives a message comprising a piece of information, referenced URL_$n_0$ in FIG. 1. The database 4 is consulted in order to search for this URL_$n_0$ information among the search field values of the database. The distributed equipment 2 returns a response, referenced AUTH in FIG. 1, depending on the result of the search.

For example, as shown in FIG. 1, the database 4 can store a list of URL (Uniform Resource Locator) addresses and, for each URL, an attribute value indicating if the content corresponding to this URL is or is not disapproved for children. The distributed equipment 2 can for example belong to an internet access provider. If the value URL_$n_0$ sent by the client equipment 5, for example a child's computer, is found in the database 4 and if the corresponding attribute in the database 4 has a value such that access is not disapproved for children, the equipment 2 returns a response AUTH authorising the equipment 5 to display the content corresponding to the value URL_$n_0$.

The invention is in no way limited to the protection of children on the Internet applications.

The central and the distributed equipment can typically belong to different people. For example, the daughter database is sold or leased by a database producer controlling the central equipment to a person, for example a software publisher or an internet access provider, controlling the distributed equipment. The latter is thus able to use the daughter database for a use other than that foreseen by the database producer. For example, the daughter database could be transferred from the distributed equipment to a third party, disclosed, copied partially or totally reused, etc.

SUMMARY OF THE DISCLOSURE

The purpose of the invention is to limit uses of the distributed databases other than those foreseen by the database producer.

According to a first aspect, the invention relates to a module intended to be embedded in an equipment of a telecommunication network and comprising:

a database storing at least search field values including URL addresses, at least some of these URL addresses being stored in an encrypted form, and encryption means capable of encrypting a piece of information received by the module in order to allow an information search in the database by comparison with the encrypted search field values of the database.

Advantageously, all of the search field values of the database are encrypted, but it is of course possible to provide for leaving certain search field values in clear.

Provision can be made for the encryption means to be able to use the same algorithm as that used for giving the encrypted search field values, possibly with the same key or keys. However, any algorithm whatsoever can be used by the encryption means provided that, for a given piece of information stored in encrypted form in the database, the encryption of this piece of information in clear by the encryption means makes it possible to find the database entry which corresponds to this piece of information.

With the module according to an aspect of the invention, it is possible to interrogate the module regarding the content of the database, without it being necessary to decrypt search field values of the database. The univocal encryption used allows a consultation of the database whilst retaining its encrypted search field values, thus limiting the potential uses of the database other than those foreseen by the producer.

As the search field values of the daughter database are encrypted, the daughter database can be transmitted from one secure equipment to another without risk of disclosure. In fact, even if a pirate should intercept the database during transmission, he would be incapable of using the intercepted database because of the encryption of the search fields. The same would apply even if the pirate succeeded in overcoming the protective measures of a secure equipment and accessing the database stored in that equipment.

The invention can be applied to the field of access control, for example the protection of children on the internet. The module according to an aspect of the invention can be included onboard a distributed equipment controlled by a person other than the producer, such as for example a software publisher or an internet access provider. Because of the encryption of the search field values of the daughter database, the possible uses of the daughter database by this other person are limited. For example, the transfer of the daughter database to a third party equipment is relatively difficult, insofar as the daughter database cannot be used without the encryption means. Moreover, modifying the daughter database from the distributed equipment risks the generation of interference insofar as the search field values cannot be read in clear and insofar as the other person does not know the initial content of the database.

The invention can of course be used in other fields of application.

The encryption means can be software means, for example an interface of the API (Application Programming Interface) type and/or hardware means, for example a smartcard, a USB key, a CD-ROM, a hard disk etc.

Advantageously, the encryption means are protected, such that it is difficult for a person with bad intentions to access the code of the encryption means. It will thus be even more difficult for that person to transfer the module to a third party equipment or to modify the database himself insofar as the encryption used is unknown to him.

The invention is not limited by the way in which this protection is implemented. Software protection can be provided, for example encryption of the code of the API, or hardware protection, for example by choosing encryption means comprising a smartcard.

Alternatively, the encryption means can be freely accessible, in particular if the encryption means are incapable of decrypting the encrypted values. The method according to an aspect of the invention therefore guarantees non-access to the data of the database, the values of the search fields being in encrypted form.

The encryption of the search field values can for example be destructive, i.e. it is impossible to find the values in clear from the encrypted values, thus guaranteeing non-disclosure of the search field values. For example, the encryption can be carried out by applying a hash algorithm.

The encryption of the search field values can for example be carried out using asymmetric encryption. Asymmetric encryption consists of using different keys for encryption and decryption. The module can thus retain only the encryption key, such that even if a person with bad intentions should access the code stored in the encryption means, that person would not be able to decrypt the encrypted field values of the database.

The invention is in no way limited by the encryption algorithm used.

It is moreover possible to provide overall encryption of the database, the decryption key being stored in a memory of the module. This overall encryption provides an additional level of protection but does not in any way limit the scope of the invention.

The overall decryption key can for example be stored in the API. The API can decrypt the database by using this key, for example once only following the installation of the module in the distributed equipment or on each reception of a request message comprising a search field value. In the first case, the database is protected from an attack during the transfer to the distributed equipment. In the second case, the distributed equipment stores an encrypted database—the search field values therefore being doubly protected, which further limits non-authorized uses of the database.

Advantageously, the module comprises a memory storing a first licence number, processing means capable of calculating a second licence number as a function of an identifier of the equipment in which the module is embedded, and means of communication of the first and second licence numbers to a central equipment.

Thus, even if a malicious person should succeed in transferring the module to a third party equipment, the module would then inform the central equipment of the first licence number and of a second licence number different from the number expected for this first licence number. The central equipment, typically controlled by the database producer, would then be able to apply a sanction, for example the pure and simple blocking of the transferred database.

The invention is not of course limited to such provision of security with two licence numbers.

The identifier of the equipment making it possible to calculate the second licence number can for example be an identifier of the operating system of the equipment in which the module is included onboard, a network address of this equipment, for example an IP address, etc.

The memory, the processing means and the communication means can be integrated in the API carrying out moreover the encryption of the information received for the purpose of a search in the database.

The communication of the licence numbers can be carried out automatically by the API, during an updating of the database for example.

According to another aspect, the invention relates to a method of the construction of a module, in which at least one field value comprising a URL address is encrypted. This encrypted value is stored as a search field value of a database of the module. The database is coupled with encryption means capable of encrypting a piece of information in such a way as to allow a search for this information in the database by comparison with the encrypted search field values.

This method, which can be implemented by a databank producer's equipment for example, makes it possible to construct a module according to an aspect of the invention.

According to yet another aspect, the invention relates to a method of interrogation of a database of URL addresses embedded in an equipment of a telecommunication network, comprising the steps consisting of receiving a request message, extracting a piece of information from this message and encrypting the extracted information. This encrypted information is searched for in the database by comparison of the encrypted information with of the values of URL addresses encrypted and stored in the database as search field values. Finally, a response is sent depending on a result of the search. If the information is found in the database, the response sent can optionally comprise the value of one or more corresponding attributes.

This method, which can be implemented by an API for example, makes it possible to use the database without it being necessary to access the search field values in clear. These values can thus remain encrypted, thereby protecting the database from unauthorised uses.

Advantageously, the extraction step consists of breaking down a search field value of the request message into elementary portions and generating a set of combinations of the elementary portions, each combination of this set constituting a piece of information to be encrypted.

This breakdown makes it possible to store fewer entries in the database. For example, if the request message comprises a search field value corresponding to "http://www.foo.net/truc/bidule/machin html#truc?bidule", the database can be satisfied with the encrypted value corresponding to "www.foo.net". The value of the request message can thus be attached to a value of the database, without it being necessary to store all the variants.

The breakdown can be carried out by locating special characters, such as "/", "?", "#", ".", etc., received in the request message. The elementary portions can include these characters, or can start with the character following one of these located characters and/or can end with the character preceding one of these located characters.

Moreover, for at least one search field value, provision can be made for storing in the database an attribute value indicating the nature of this search field value. For example, an attribute value "site" can correspond to the encrypted value corresponding to "www.foo.net", indicating that all the combinations including the elementary portion "www.foo.net" are to be attached to this search field value of the database. For example, a value "exact URL" can correspond to the encrypted value corresponding to "www.foo.net/truc/chose.htm", indicating that only the encrypted combinations identical to this encrypted value are to be attached to this value.

It is of course possible to provide for certain attribute values to have priority over others. Thus, if from a same received message several encrypted search field values are recognised in the database, the priority given to the corresponding attributes makes it possible to choose one of these encrypted values. For example, the attribute value "exact address" can have priority with respect to the value "site". It is thus possible to envisage, for example, authorising access to the whole of a site except for a specified sub-directory of this site and to achieve this with only two entries in the database.

It is thus possible to qualify the data stored in the database relatively precisely and to respond to request messages in a relatively apt manner.

Provision can also be made for the extraction step to comprise the step consisting of generating, from a search field value received in the request message, that value comprising an initial string of characters, a set comprising the initial string of characters and/or at least one string of characters obtained by deletion of at least one character at one end and/or at the other end of the initial string of characters, each string of characters of the set constituting a piece of information to be encrypted. The search step is carried out iteratively, by choosing the information to be searched for in order of decreasing string length and the search is ended in the event of success during a given iteration.

The information of the set can be generated at the same time, prior to the encryption step or steps. A step of sequencing of the strings of characters of the set in size order can be provided, the first string comprising the longest string and the last string comprising the shortest string. The search step is carried out for the first (encrypted) string, and in the event of failure, is repeated iteratively by choosing the next string. In the event of success, the iteration is ended.

Alternatively, provision can be made for generating a string of characters of the set only in the event of failure of the search for the preceding string of characters. If the first iteration is successful, the set then comprises a single string of characters.

The set can comprise or not comprise the initial string.

According to yet another aspect, the invention relates to a method of interrogation of a database, comprising the steps consisting of
  receiving a request message comprising a search field value composed of an initial string of characters,
  searching for said search field value in the database in an iterative manner, each iteration corresponding to searching for a piece of information by comparison with the search field values stored in the database, the information being chosen in order of decreasing string length from one iteration to the next from a set comprising the initial string of characters and/or at least one string of characters obtained by deletion of at least one character at one end and/or at the other end of the initial character string.

Advantageously, the method comprises moreover the step consisting of ending the search in the event of success during a given iteration. Thus, the search is ended at the first iteration during which the search is successful, such that no search is carried out for shorter strings of characters (shorter than the string for which the search was successful).

The invention is in no way limited by this feature. It is for example possible to provide for carrying out the search in order of decreasing string length by repeating the iterations down to, for example, a predetermined minimum string length (set for example at one character or three characters), and then choosing a string from among the strings for which the search was successful.

The search method according to this aspect of the invention can make it possible to avoid the steps related to the qualification of a character string.

For example, in the case of a method in which, following the reception of a search message comprising a URL address, a search is carried out only for this exact URL, for example
  "http://www.foo.net/truc/bidule/machin html", and/or for the site address corresponding to this URL, for example "http://www.foo.net/", it is then necessary to carry out those steps related to the qualification.

For example, the database can be structured according to the attribute values: it is then necessary, before starting the search, to know if a piece of information searched for is an exact address or a site address in order to know which memory zone to carry out the search in.

According to another example, the search by comparisons is carried out without preconception regarding the qualification, but once a piece of information is found, the value of the corresponding attribute in the database is checked. For example, for a search field value corresponding to
  "http://www.foo.net/truc/bidule/machin html#truc?bidule",
if only "http://www.foo.net" is found with the attribute "exact address", it is considered that the search is not successful. A test step regarding the value of the attribute is therefore necessary.

By proposing a systematic search from the longest string to the shortest string, the method described above makes it possible to avoid those steps related to the qualification of the string searched for. In fact, advantageously, when a given iteration proves to be successful, no search is carried out for shorter strings.

Moreover, this method provides relative flexibility for the creation of databases. With the method described above in which only the exact URL and/or the site address can be searched for, it is relatively difficult to reference any sub-directory or any other intermediate level. For example, if it is desired to authorise access to the whole of the site "www.foo.net" with the exception of the sub-directory truc, it is necessary to reference all of the exact URL addresses of the sub-directory truc.

With the systematic search method, it suffices to reference two entries: "http://www.foo.net/" and "http://www.foo.net/truc/". During an iterative search for the value "http://www.foo.net/truc/bidule/machin.html#truc?bidule"
  the string of characters "http://www.foo.net/truc/" is recognised before "http://www.foo.net/" since it is longer and access to the URL will be refused.

This method makes it possible to avoid heavy workloads related to the qualification of search fields in the database.

The database can be a distributed database or any other type of database.

The initial string of characters can be an exact URL address, or any other information.

Advantageously, each iteration can comprise, prior to the comparison steps, a step of encrypting the string of characters to be searched for. The search fields of the database can in fact be stored in encrypted form, in order to limit the possible uses of the database.

Alternatively, the search is carried out on the basis of comparisons of values in clear.

Advantageously, in each iteration, the corresponding information comprises a string of characters obtained by deletion of one or more special characters of the type "/", "?", "#", ".", etc. or by deletion of non-special characters (of the letters and figures type) preceding or following a special character, for example a punctuation character, at the start or at the end respectively, of the character string of the information searched for during the preceding iteration.

In this way, time wasted in searching for non-plausible strings of the type

"http://www.foo.net/tr" is avoided.

Thus, from the exact address

"http://www.foo.net/truc/index.htm", only the following strings, for example, will be able to be searched for:

"http://www.foo.net/truc/index.htm"
"http://www.foo.net/truc/index."
"http://www.foo.net/truc/index"
"http://www.foo.net/truc/"
"http://www.foo.net/truc"
"http://www.foo.net/"
"http://www.foo.net"
"www.foo.net"

BRIEF DESCRIPTION OF THE DRAWINGS

Other features and advantages of the present invention will become apparent from the following description.

FIG. 6 is a flowchart illustrating a method according to another embodiment of the invention.

Identical or similar elements can have the same references from one figure to another.

DETAILED DESCRIPTION OF THE DISCLOSURE

Figure 1:
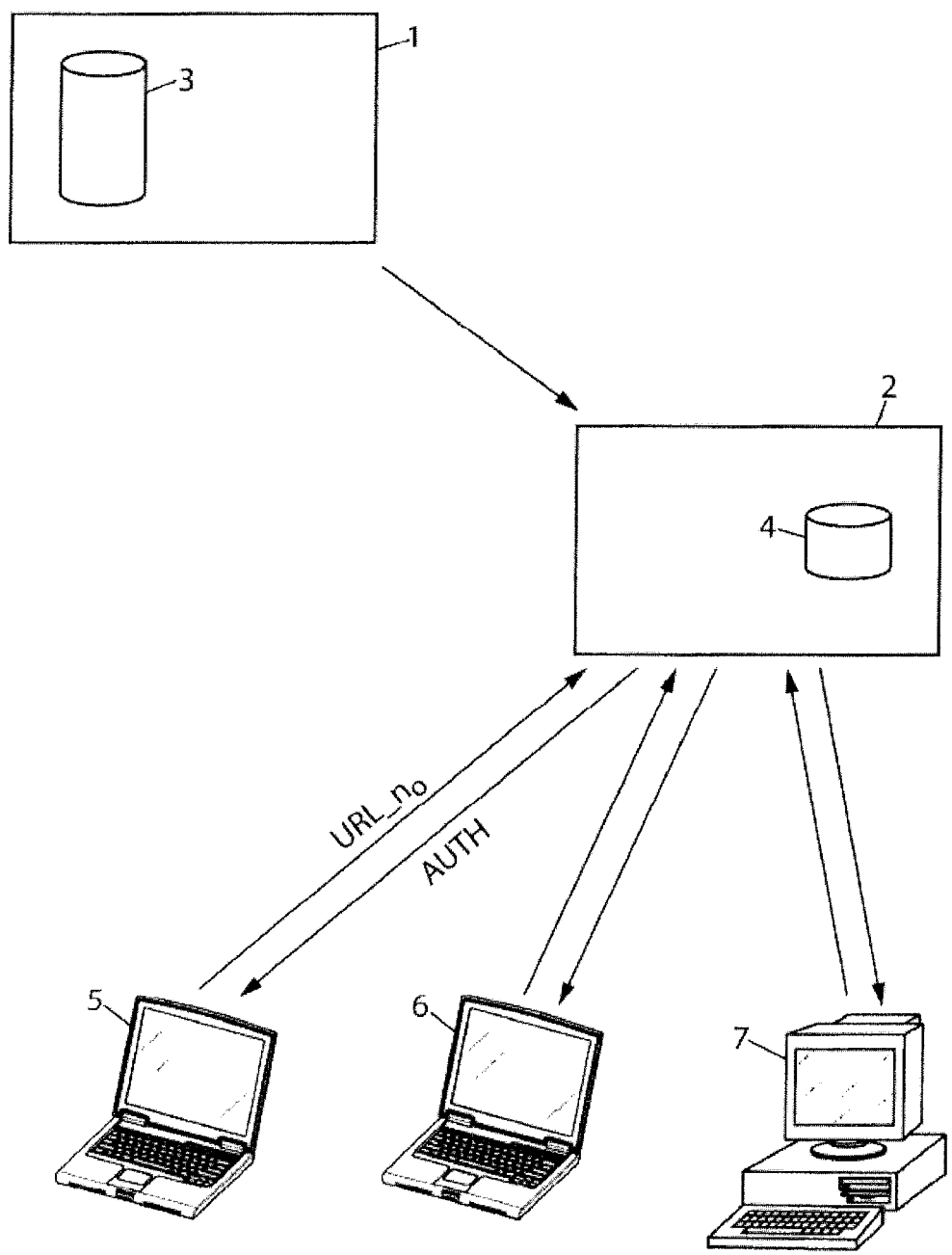
FIG. 1 shows an example of a system using a distributed database.
Figure 2:
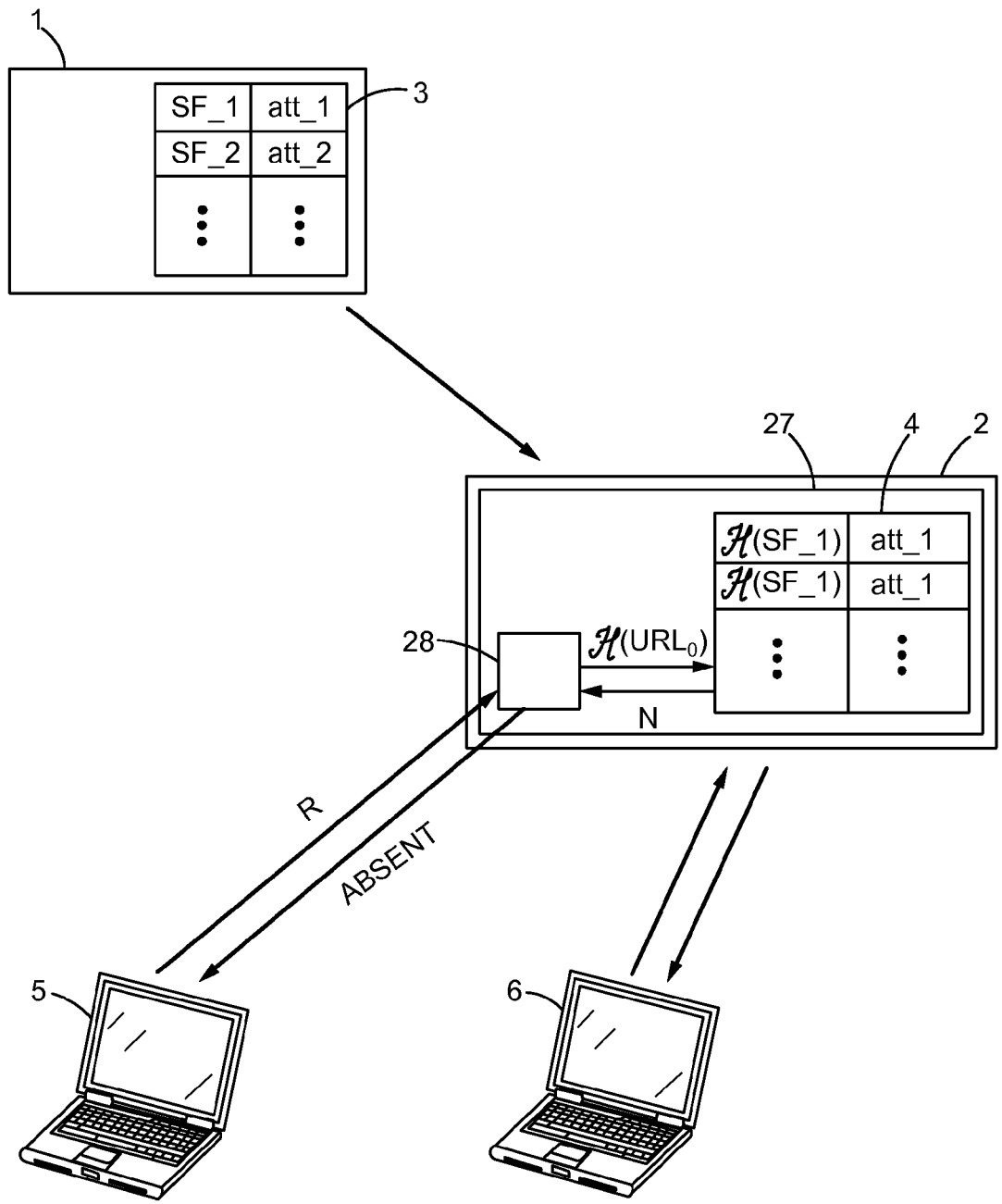
FIG. 2 shows an example of a system using a distributed database according to an aspect of the invention.

The system of FIG. 2 comprises a central equipment 1 storing a mother database 3. The database 3 is structured with entries, each entry comprising in this example a search field value SF_1, SF_2, etc. and an attribute att_1, att_2, etc.

In this example, the database 3 stores the search field values SF_1, SF_2 in clear, thus allowing easy operation of the database 3 by a database producer controlling the central equipment 1. Alternatively, provision can be made for the mother database to store the search field values in an encrypted form, for example for greater security.

The field values SF_1, SF_2, etc. are encrypted, for example by using a hash function, and stored in hashed form as search field values of a daughter database. The hashing can for example be carried out using a well-known hash function, for example of the Haval type.

This daughter database is transmitted to a distributed equipment 2, in a module 27 comprising moreover encryption means, for example an application 28 capable of using this hash function.

If a client equipment 5,6 interrogates the distributed equipment 2 by sending a request message R, the application 28 extracts from this message a piece of information $URL_0$, and hashes this information. The search among the entries of the daughter database 4 is carried out on the basis of this hashed information.

In fact, if the database 4 comprises an entry corresponding to this information $URL_0$, then one of the hashed search field values H(SF_1), H(SF_2), etc. is equal to the value of the hashed information $H(URL_0)$. Provision can be made such that if the hashed information is found, the module 27 returns a positive response, or also an attribute value corresponding to this hashed information within the database 4. Provision can be made such that if the hashed information is not found, the module 27 returns a negative response, such as shown in FIG. 2.

As the search field values of the daughter database are encrypted, the daughter database can be transmitted from one secured equipment to another without risk of disclosure.

The invention can thus be applied in the field of the databases of illegal sites in a given country, for example paedophilic sites or gambling sites in France. The invention makes it possible to transfer all or part of these databases, for example for the purpose of crosschecking between police departments, without risking the disclosure of a list of illegal sites to a malicious person. More generally, as the invention makes it possible to limit unauthorised uses of these databases, the invention makes it possible to offer wider access to these databases for their normal use.

Once the database 4 is installed, the distributed equipment 2 can communicate with the central equipment 1, in particular in order to update the daughter database 4. The database 4 can in fact be refreshed relatively frequently, for example every day or every week, in order to reflect the latest modifications made to the mother database 3.

Figure 3:
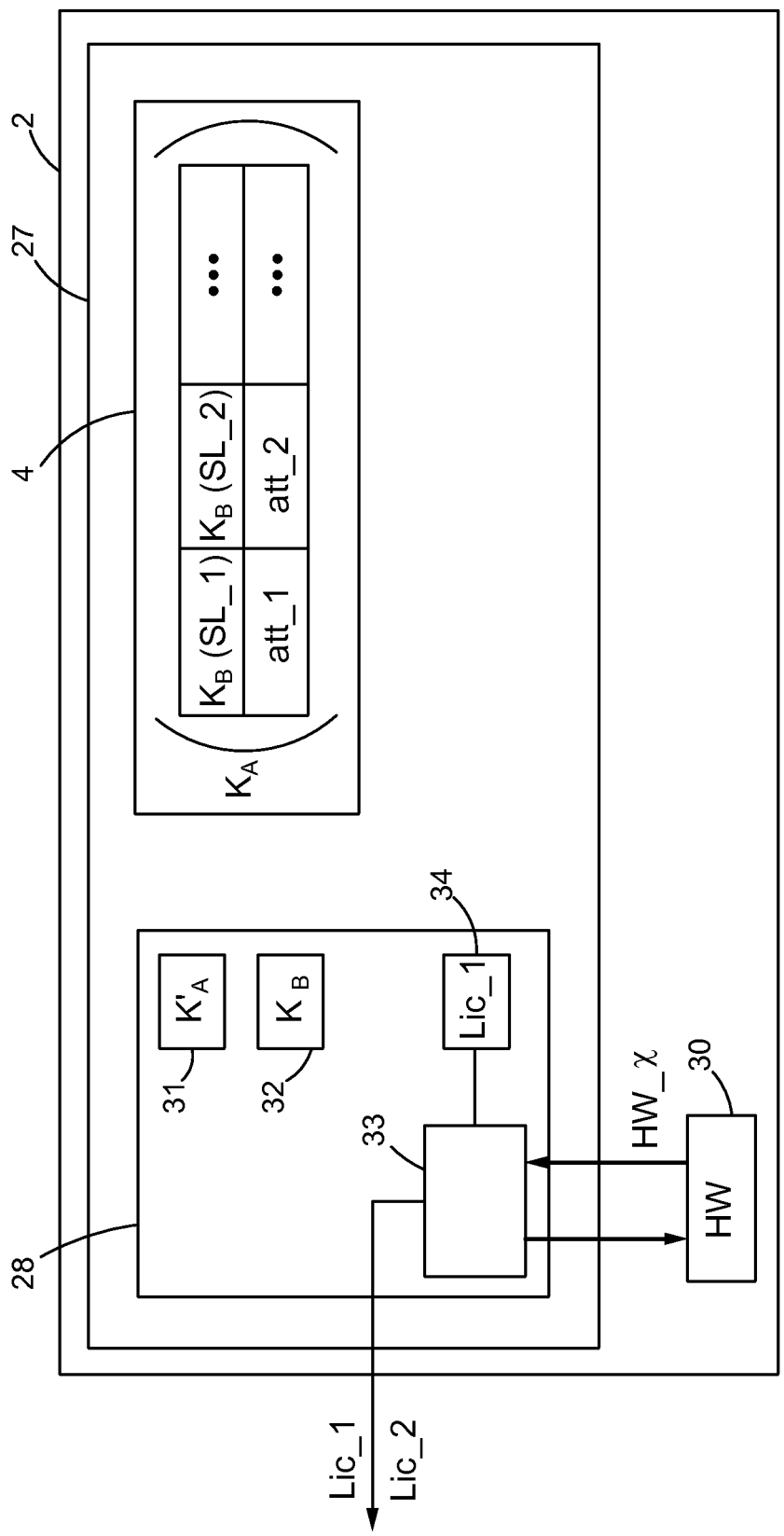
FIG. 3 shows an example of a module according to an embodiment of the invention, installed in a distributed equipment.

FIG. 3 shows in a diagrammatic manner another example of a module 27 stored in a distributed equipment 2. In this example, the module 27 comprises a database 4 globally encrypted with a key $K_A$. The module 27 comprises moreover an API 28 with a memory 31 storing a key $K_A'$ making it possible to decrypt the content of the database 4 in its totality. When the module 27 receives a request message for the purpose of consulting the daughter database, the API starts by decrypting this database using the key $K_A'$.

In this example, the global encryption algorithm of the daughter database is asymmetrical, i.e. the keys $K_A$ and $K_A'$ are different, but it can of course be arranged otherwise.

Moreover, as seen previously, the database 4 stores search field values in encrypted form $K_B(SL\_1)$, $K_B(SL\_2)$, etc. In this example, the encryption of the search field values has been carried out within a central equipment (not shown in FIG. 3) using an asymmetrical encryption algorithm, for example RSA (Rivest Shamir Adleman), with an encryption key $K_B$. The API 28 stores the value of this encryption key $K_B$ in a memory 32 in order to be capable of carrying our this same encryption following the reception of a request message. The decryption key corresponding to this encryption $K_B$ is not known by the API, so that the API is incapable of decrypting the encrypted search field values.

Finally, in this example, in order to obtain an updated file from the central equipment, the module 27 must send two licence numbers, in addition to a module identifier and version index pair. The first licence number LIC_1 is retained in a memory 34 of the API 28. This first licence number LIC_1 has for example been obtained from the central equipment itself. The API comprises processing means 33, for example a processor, capable of reading a memory 30 of the distributed equipment 2 storing a hardware identifier of the equipment 2, for example a serial number $HW\_\chi$. The processing means 33 calculate a second licence number LIC_2 from the serial number $HW\_\chi$.

The two licence numbers are sent by communication means which are not shown, for example a communications port.

In general, the invention is not limited by the form of the processing means, the communication means, or the memories. For example the component used as processing means can moreover serve as a memory storing the keys $K_A'$, $K_B$ and/or the number LIC_1.

Thus, if the module 27 was installed without the authorisation of the central equipment in a third party distributed equipment (not shown), the second licence number, depending on the distributed equipment in which the module is included onboard, would be different. Thus, during an update request, the central equipment is able to detect an unauthorised transfer from the distributed database. The central equipment is then capable of reacting, for example by triggering an alarm, informing the database producer of the problem, by blocking the module installed without authorisation, etc.

Figure 4:
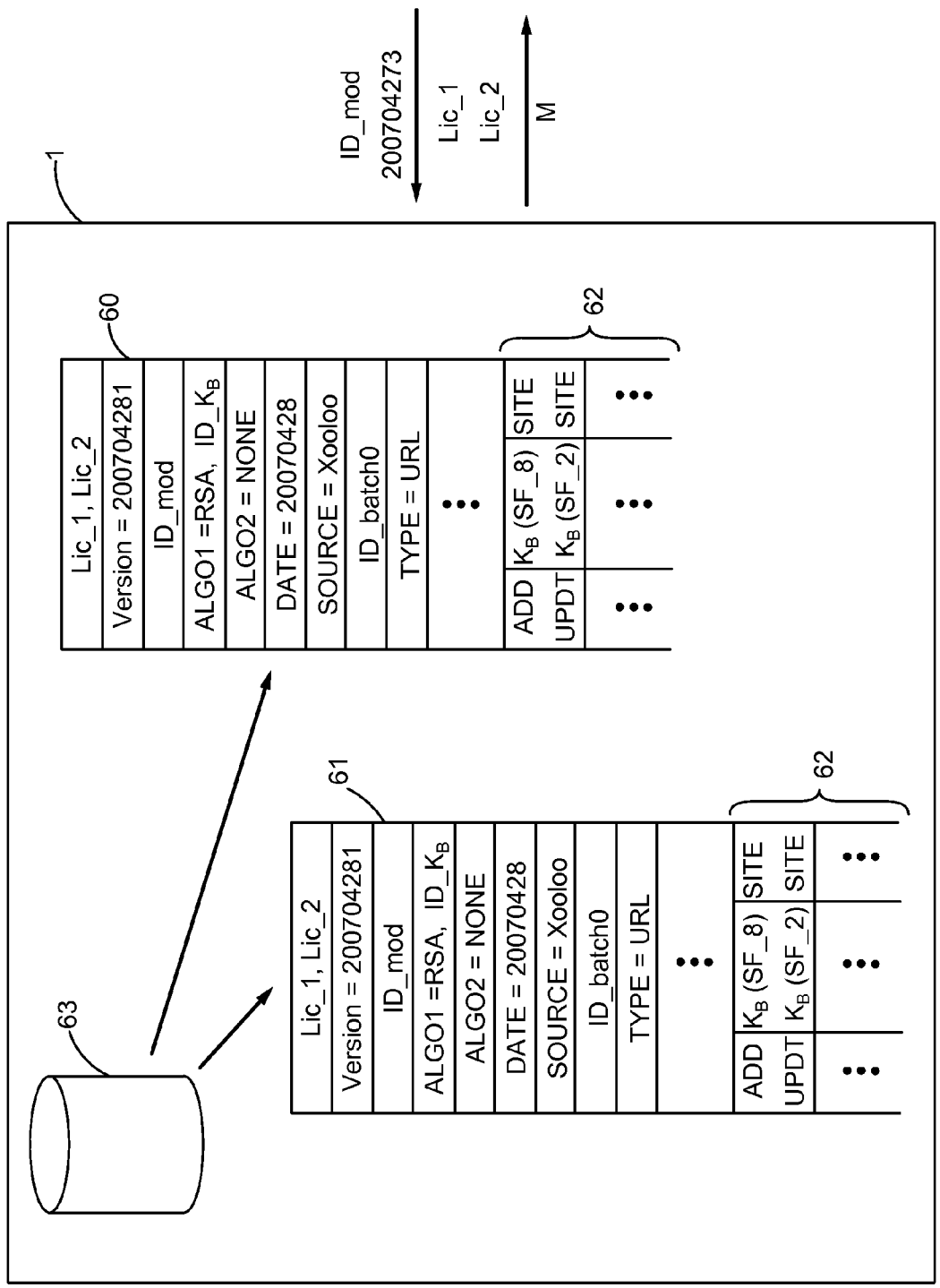
FIG. 4 illustrates a method of construction of a module according to an embodiment of the invention.

FIG. 4 shows and example of the construction of a module according to an embodiment of the invention.

A central equipment 1 stores an original database 63 storing search field values in clear, for example in XML (Extensible Markup Language) format.

The equipment 1 stores moreover database sub-sets 60, 61. These sub-sets 60, 61 are intended to be transmitted, for example by downloading, to distributed items of equipment. The sub-sets 60, 61 are themselves filed within the central equipment on the basis of distributed equipment, using a module identifier ID_mod.

These sub-sets include data coming from the original database 63, in lots or batches 62. Each batch 62 is structured with entries.

Certain search field values SF_8, SF_2, etc., stored in the mother database are encrypted according to a first algorithm. These encrypted values $K_B(SF\_8)$, $K_B(SF\_2)$ are stored in the sub-set 60 as a search field value of a database intended for the distributed equipment corresponding to this sub-set 60.

The sub-sets store an identifier of the first algorithm and an identifier of the encryption key $K_B$ used (and/or the encryption key itself). These identifiers and optionally this key are transmitted with the corresponding batch to a distributed equipment, which can then be able to form a module comprising encryption means and a distributed database. The distributed equipment then stores the encrypted values $K_B(SF\_8)$, $K_B(SF\_2)$ as search field values of a database of the module.

Alternatively, the central equipment 1 can couple the sub-set with an API capable of carrying out the same encryption. This API constitutes with the sub-set a module intended to be transmitted in its entirety to the distributed equipment. In this case, within the sub-set 60, the encrypted values $K_B(SF\_8)$, $K_B(SF\_2)$ are stored as search field values of the module.

Advantageously, the client equipment is capable of transmitting distributed databases updating data. The sub-sets 60, 61 can in fact be arranged in such a way as to be used for updating purposes. For example, the sub-sets 60, 61 include a version number, for example 200704281. Moreover, each batch entry comprises an operation field defining if this entry must be added to the distributed database, deleted or updated for example.

During an updating of the distributed database, the distributed module interrogates the central equipment 1 in order to check if an update is available, download changes from the server equipment and include these changes in the local database 4. Each module has an identifier ID_mod, allowing the central equipment 1 to recognise the database sub-set which is intended for this module.

For a given module identifier-version index pair, the central equipment is therefore capable of listing the possible revisions that have occurred since this version.

According to the module-identifier version index pair, the central equipment is able to generate a file containing the changes that have occurred since this version.

Thus, when a distributed equipment interrogates the central equipment 1 regarding possible modifications, the equipment 2 transmits a module identifier ID_mod, and an index representative of the latest version received from the central equipment 1, as well as possibly two licence numbers LIC_1, LIC_2. The central equipment then returns in response a file M containing the changes that have occurred since this version, the search field values being stored in an encrypted form in this file. The file M can comprise a sub-set, or can be obtained from a sub-set, etc.

The file M can undergo a compression, of the zip type for example, and/or be encrypted before the transmission.

The sub-sets 60, 61 can comprise other fields, for example a field specifying the type of the search fields, in this case URLs, a date of creation field, a source entity field, a field for the overall encryption algorithm used if necessary and fields for possible comments, the batch identifier, the date on which the batch can be ignored in ISO-8601 format, etc.

It will be noted that a batch can have several destinations, i.e. that it can be possible for a batch to be transmitted to several distributed items of equipment.

The batch is structured with entries, each entry being able to comprise several fields: a internal identification field for the producer, which is of course optional, a URL address (or any other information) in encrypted form (digest), it being possible for the encryption algorithm to be specified in a header, an attribute whose value indicates the nature of the URL, for example "site", "page" or "domain", an attribute defining for example a right of access to the URL for certain persons, like children, adolescents, employees of a company, etc.

Figure 5:
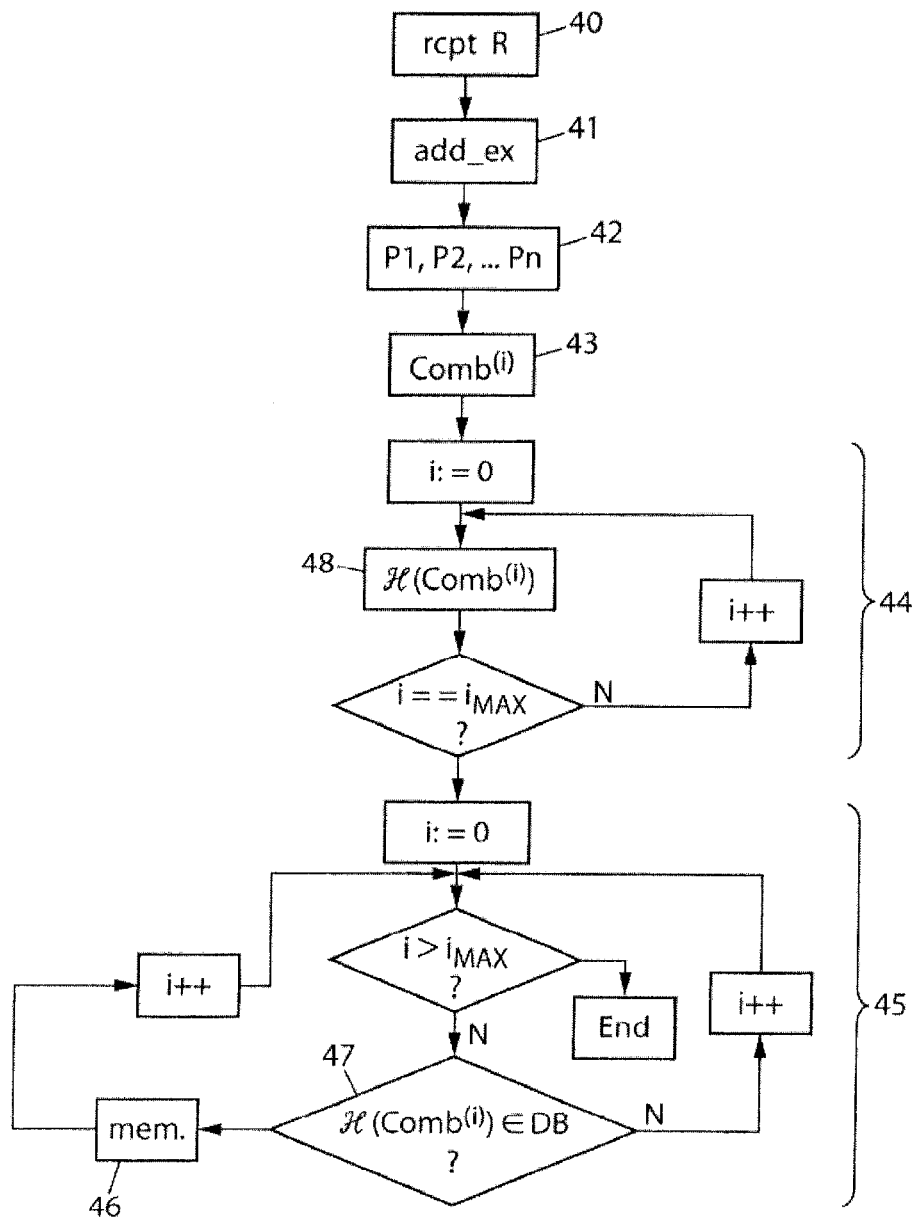
FIG. 5 is a flowchart illustrating a method used by a module according to an embodiment of the invention.

FIG. 5 shows an example of an algorithm used by a module according to an embodiment of the invention.

After a step 40 of reception of a request message comprising a URL address, for example "http://www.foo.net/truc/bidule/machin html#truc?bidule", the module isolates this exact address during a step 41.

Then, during a step 42, the exact address is broken down into elementary portions P1, P2, . . . Pn, for example:

("http://"), ("www.foo.net", ("/truc/bidule/machin.html") and ("#truc ?bidule").

Following a step 43 during which a set of combinations of one or more of these elementary portions is generated, for example:

"www.foo.net/truc/bidule/machin.html"

The elementary portion ("http://") can be ignored systematically.

The breakdown can be more detailed, for example:

("http://"), ("www."), ("foo.net"), ("/truc"), ("/bidule"), ("/machin.html") and ("#true ?bidule")

Step 43 can then result in combinations of the type:

"www.foo.net/"

"www.foo.net"

"www.foo.net/truc/"

"www.foo.net/truc"

"www.foo.net/truc/bidule/"

"www.foo.net/truc/bidule"

etc.

It is therefore possible to make provision for retaining in the set of combinations only certain plausible combinations.

For example, the combinations for which the letters "www" appear relatively late, of the type "truc?bidule/truc/www.foo.net"

are not retained.

Each combination of the retained set of combinations, indexed i in FIG. 4, constitutes a piece of information to be encrypted during an encryption phase 44.

This phase 44 implements a loop with the index i. Each combination of the set of combinations retained is hashed during a step 48.

The database can then be searched during a search phase 45 implementing for example a loop with the index i, on the basis of comparisons of the hashed combinations and search field values encrypted during comparison steps 47.

If a comparison shows that a hashed combination is equal to one of the encrypted search field values, then this encrypted value is stored during a step 46, with the corresponding possible attributes.

The search can be stopped after the first encrypted value storage, or all of the combinations can be scanned before stopping the search 45, such as shown in FIG. 5.

In this latter case, it is possible that several encrypted values have been stored. The filing of these found values according to the value of their attribute, for example "site", "exact URL", etc., can be envisaged.

A priority can be allocated to the possible values of this attribute. For example, the value "exact URL" can have priority over the value "site".

Which entry to recognise among the entries stored in step 46 is therefore chosen according to the attribute value of highest priority.

A response can be sent, indicating for example if the search is successful and/or indicating a value of one or more attributes corresponding to the recognised entry, for example "authorised site".

FIG. 6 is a flowchart illustrating a method according to an embodiment of the invention. Following a step 70 of reception of a request message, an exact address, also called an initial string of characters, is isolated during a step 71.

A string search variable is allocated the value of this initial string of characters during a step 72. An iterative search, referenced 74, then follows, during which comparisons of this string variable with search field values stored in the database are carried out.

These comparisons can be carried out using values in clear or, as shown in FIG. 6, using encrypted values. A step 73 for encryption, for example by hashing, and a search step 76 using encrypted values are then provided.

In the event of failure, during a step 75 a new string of characters is generated, by deletion of one or more characters at one and and/or at the other end of the current string of characters. These iterative generations constitute extractions of information to be encrypted during step 73.

In the event of success, it is considered that the search is successful and the iterations 74 are ended during a step 77.

It is moreover possible to provide one or more test steps, that are not shown, following the generation step 75, during which step or steps it is checked that the new string generated is still plausible. For example, if two successive strings end with a letter, an additional character is deleted and this procedure is repeated until the new string ends with a special character.

For example, if the new string no longer contains any special characters, it is considered that the string is too short and the search is ended. In this latter case provision can be made for returning a response of the ABSENT type. According to an embodiment which is not shown, the generation of all of the strings is carried out at one time, prior to the iteration.

The optional hashing step can also be carried out prior to the iteration, all of the strings then being retained in a temporary memory in hashed form.

The invention claimed is:

1. Equipment of a telecommunication network comprising:
   a distributed equipment including a storage device associated with a processor;
   a module, the module embedded in the distributed equipment, the module including:
   a database storing at least search field values corresponding to URL addresses, at least some of said URL addresses being stored in an encrypted form, wherein the search field values are associated with respective attribute values, the attribute values being ordered by priorities,
   an encryption entity capable of breaking down a search field value received by the module into elementary portions, generating a set of combinations of elementary portions, encrypting pieces of information, each combination of the set constituting a piece of information to be encrypted, in order to allow an information search in the database by comparison with the encrypted search field values, for directly determining whether at least one combination of the set comprises a search field value stored in the database,
   wherein, if several combinations are determined to comprise given respective search field values, the search field value being associated with the attribute having the higher priority among the attributes associated with the given respective search field values is chosen as a recognized entry.

2. The equipment according to claim 1, wherein the encryption entity is protected.

3. The equipment according to claim 1, wherein the encryption entity uses a destructive encryption algorithm.

4. The equipment according to claim 1, wherein the encryption entity uses an asymmetrical encryption algorithm.

5. The equipment according to claim 1, wherein the totality of the content of the database is encrypted, the module comprising moreover a memory for storing a decryption key.

6. The equipment according to claim 1, comprising
   a memory storing a first licence number,
   the processor capable of calculating a second licence number as a function of an identifier of the equipment in which the module is embedded,
   a communication interface adapted to send the first and second licence numbers to a central equipment.

7. A method of construction of a module intended to be embedded in an equipment of a telecommunications network, comprising the steps of
   encrypting field values corresponding to URL addresses,
   storing said encrypted values as a search field values of a database of the module, wherein the search field values are associated with respective attribute values, the attribute values being ordered by priorities,
   coupling an encryption entity with the database, said encryption entity being capable of breaking down a search field value received by the module into elementary portions, generating a set of combinations of elementary portions, encrypting pieces of information, each combination of the set constituting a piece of information to be encrypted, in order to allow an information search in the database by comparison with the encrypted search field values, for directly determining whether at least one combination of the set comprises a search field value stored in the database, wherein if several combinations are determined to comprise given respective search field values, the search field value being associated with the attribute having the higher priority among the attributes associated with the given respective search field values is chosen as a recognized entry.

8. The method of interrogation of a database of search field values corresponding to URL addresses embedded in an equipment of a telecommunications network, wherein the search field values are associated with respective attribute values, the attribute values being ordered by priorities, comprising the steps consisting of receiving a request message, extracting a piece of information from the request message by breaking down a search field value received in the request message into elementary portions and generating a set of combinations of elementary portions, encrypting the extracted information, each combination of the set constituting a piece of information to be encrypted, searching for the encrypted information in the database by determining whether at least one combination of the set comprises a search field value stored in the database, wherein, if several combinations are determined to comprise given respective search field values, the search field value being associated with the attribute having the higher priority among the attributes associated with the given respective search field values is chosen as a recognized entry, and sending a response depending on a result of the search.

9. The method according to claim 8, wherein the extraction step consists of generating from a search field value received in the request message, said value comprising an initial string of characters, a set comprising the initial string of characters and/or at least a string of characters obtained by deletion of at least one character at one end and/or at the other end of the initial character string, each string of characters of the set constituting a piece of information to be encrypted, wherein the search step is carried out iteratively, by choosing the information to be searched for in order of decreasing string length, and wherein the search is ended in the event of success in a given iteration.

10. The method according to claim 9, wherein, at each iteration, the corresponding information comprises a string of characters obtained by deletion of one or more special characters, in particular of the type "/", "?", "#", "." and other non-letter characters, or by deletion of the non-special characters, in particular of the letter or figure type, preceding or following a special character at the start or at the end respectively of the string of characters of the information searched for during the preceding iteration.

* * * * *